(12) United States Patent
Herrmann et al.

(10) Patent No.: US 11,888,178 B2
(45) Date of Patent: Jan. 30, 2024

(54) METHOD FOR PRODUCING AN ELECTRIC BATTERY WITH SEPARATOR MATERIAL ON A CURRENT COLLECTOR BASE

(71) Applicants: Volkswagen AG, Wolfsburg (DE); AUDI AG, Ingolstadt (DE); Dr. Ing. h.c. F. Porsche AG, Stuttgart (DE)

(72) Inventors: Mirko Herrmann, Mountain View, CA (US); Angela Speidel, Wolfsburg (DE)

(73) Assignees: Volkswagen AG, Wolfsburg (DE); Audi AG, Ingolstadt (DE); Dr. Ing. h.c. F. Porsche AG, Stuttgart (DE)

( * ) Notice: Subject to any disclaimer, the term of this patent is extended or adjusted under 35 U.S.C. 154(b) by 924 days.

(21) Appl. No.: 16/125,995

(22) Filed: Sep. 10, 2018

(65) Prior Publication Data

US 2020/0083508 A1   Mar. 12, 2020

(51) Int. Cl.
   *H01M 50/46* (2021.01)
   *H01M 4/04* (2006.01)
   *H01M 10/05* (2010.01)
   *H01M 10/0525* (2010.01)

(52) U.S. Cl.
   CPC ......... *H01M 50/46* (2021.01); *H01M 4/0404* (2013.01); *H01M 10/0525* (2013.01)

(58) Field of Classification Search
   CPC ............. H01M 2/1673; H01M 4/0404; H01M 10/0525; H01M 2220/20; H01M 50/46
   See application file for complete search history.

(56) References Cited

U.S. PATENT DOCUMENTS

| | | | |
|---|---|---|---|
| 2011/0159347 A1 | 6/2011 | Shibano et al. | |
| 2011/0183203 A1 | 7/2011 | Du et al. | |
| 2012/0225345 A1* | 9/2012 | Kim | H01M 2/1686 429/145 |
| 2014/0212729 A1 | 7/2014 | Park et al. | |
| 2017/0012264 A1 | 1/2017 | Carlson et al. | |
| 2018/0138513 A1* | 5/2018 | Dai | C23C 18/54 |

* cited by examiner

*Primary Examiner* — Ula C Ruddock
*Assistant Examiner* — Frank A Chernow
(74) *Attorney, Agent, or Firm* — Davidson, Davidson & Kappel, LLC

(57) ABSTRACT

The present invention provides a method for manufacturing a battery cell component including providing a current collector foil and placing separators onto the current collector foil at spaced intervals. A battery cell component, battery and electric or hybrid vehicle is also provided.

10 Claims, 11 Drawing Sheets

METHOD FOR PRODUCING AN ELECTRIC BATTERY WITH SEPARATOR MATERIAL ON A CURRENT COLLECTOR BASE

The present invention relates generally to batteries and more particularly to batteries for electric vehicles.

BACKGROUND

A typical lithium-ion battery stack will have an anode, a separator, a cathode, and a current collector. U.S. Patent Publication No. 2017/0012264 discloses electrode coating layers that may be coated on the entire surface of the separator layer, in lanes or strips on the separator layer, or in patches or rectangle shapes on the separator layer. The battery stacks also include a current collector, which can be one or more current collection layers that are adjacent to an electrode layer. The current collector may include, for example, a single conductive metal layer or coating, such as a sintered metal particle layer. An exemplary conductive metal layer that could function as a current collector is a layer of sintered metal particles comprising nickel, which also can be used for both the anode or cathode layer. In other embodiments of the invention, the conductive metal layer may comprise aluminum, such as aluminum foil, which may be used as the current collector and substrate for the positive electrode or cathode layer. In other embodiments the conductive metal layer may comprise copper, such as a copper foil, which may be used as the current collector and substrate for the negative electrode or anode layer.

SUMMARY OF THE INVENTION

The present invention seeks to minimize the number of tools, devices and machines to shorten the production time and to lower investment and production cost.

The present invention provides a method for manufacturing a battery cell component comprising:
providing a current collector foil; and
placing separators onto the current collector foil at spaced intervals.

Separators, often made of polymer foil, typically form a base in manufacturing processes due to their stability. The present invention however uses a current collector foil to support the separator, which while more sensitive from a manufacturing standpoint due to the collector foil in some respects, can reduce production time and lower investment and production cost. The foil can be unrolled from a roll and moved as the separator is placed on the foil.

The separator can be placed as a coating or preferably periodically as a stand-alone separator or as a separator-electrolyte unit on one side or both sides of the current collector and thus can form a so-called separator-electrolyte current collector unit (SE-collector).

The current collector can be a foil with a thickness of 1 to 50 µm and composed of copper, aluminum, nickel, nickel coated on aluminum or graphite.

A separator capable of conducting lithium-ions from one side to another side and back is called herein a "sepolyte". The sepolyte can be a polymer separator soaked with liquid electrolyte or gel electrolyte, a solid polymer separator/electrolyte such as a PEO based separator or solid-state electrolytes such as lithium oxide or sulfide glasses or glass ceramics or ceramics.

If only one side of the current collector has a separator or a sepolyte the other side can be coated periodically with active material of cathode or anode material. On one side is a separator or sepolyte and the other side is an electrode made of cathode or anode material which are bonded periodically directly on the current collector and creates a so-called SEEL-collector unit (separator-electrolyte-electrode-current-collector unit).

Depending on the properties of the separator/sepolyte, a lubrication layer can be placed between the separator/sepolyte and the current collector. This lubrication layer is soft and allows a sliding and reduces friction between the separator/sepolyte and current collector during manufacturing and charging/discharging of the battery cell. The lubrication layer is relatively softer than the current collector to minimize any physical stress onto the sepolyte and has a good electronically conductivity.

The lubrication layer on the current collector can be made of soft material such as graphite or soft light metal including sodium, potassium, magnesium or calcium, or of soft heavy metal such as tin, lead, bismuth, or cadmium, or of alloys such as Wood's metal or alloys such as tin-lead solder, soft solder and low-antimony soft solder. Lubrication layer 300 can have a thickness of 0.05 to 500 µm, preferred 0.07 to 100 µm, and most preferred 0.1 to 5 µm.

If a lubrication layer is used, the current collector will be coated on one or both sides with a lubrication layer and creates a current-lubrication collector, a so-called CULUB collector. The separator or sepolyte can be periodically put or manufactured directly onto the CULUB collector on one or both sides.

If only one side of the CULUB collector has a separator or sepolyte the other side can be coated periodically with an electrode of cathode or anode active material. The whole unit can be processed as a roll-to-roll process and creates a so-called SELUEL-collector unit (separator-electrolyte-lubrication layer-electrode-current collector unit) or SEDLUEL-collector unit (separator-electrolyte-double lubrication layer-electrode-current collector unit).

The separator or sepolyte and the electrode for cathode or anode are fixed and bonded onto the current collector or CULUB collector. This unit can be easily handled for the next steps.

The continuously connected units of sepolyte-collector-electrode are then cut into single units of sepolyte-current collector-electrode or sepolyte-CULUB collector-electrode units. For a better and faster manufacturing of these units a polymer frame can used to create polymer frame supported sepolyte-current collector-electrode or sepolyte-CULUB collector-electrode units.

The frame supported units can be stacked to create a stack of single SELU-collector units or SELUEL-collector units.

The present invention also provides a battery cell component manufactured according to the methods discussed above, as well as an electric or hybrid vehicle comprising the battery cell component. Also provided is a battery for an electric or hybrid vehicle comprising: a first current collector attached to a first polymer frame; a first electrode attached to the first current collector extending through the first polymer frame; and a first separator opposite the first electrode; a second current collector attached to a second polymer frame; a second electrode attached to the second current collector extending through the second polymer frame; and a second separator opposite the second electrode; the first electrode and the second separator being connected. An electric or hybrid vehicle comprising the battery is also provided.

BRIEF DESCRIPTION OF THE DRAWINGS

The present invention will be detailed with respect to different exemplary embodiments for battery cell components according to the present invention, as described below, in which.

DETAILED DESCRIPTION

Figure 1:
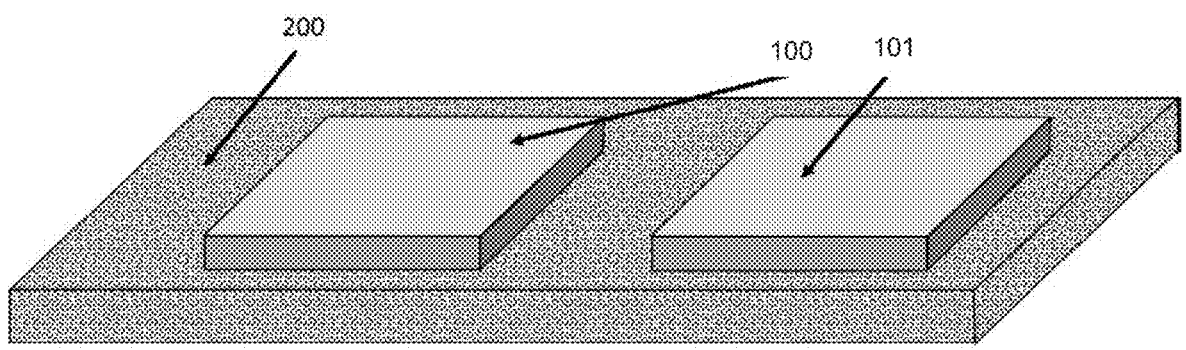
FIG. 1 shows a schematic placement of separator materials on a current collector foil to form SE-collector units.
Figure 2:
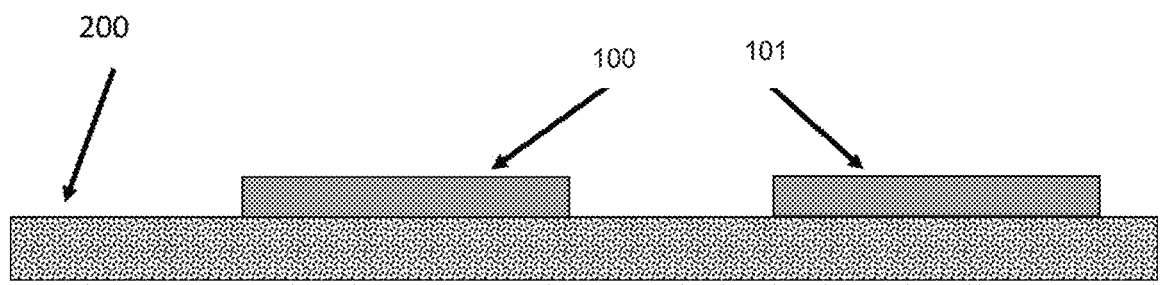
FIG. 2 shows a side view of FIG. 1.

FIGS. 1 and 2 show a schematic placement of separators 100, 101 on a current collector foil 200 to form so-called SE-collector units. The current collector foil can be unrolled from a roll and the separator can be placed periodically as a stand-alone separator or as a separator-electrolyte unit. The current collector can be a foil with a thickness of 1 to 50 $\mu$m and composed of copper, aluminum, nickel, nickel coated on aluminum or graphite. Separators 100, 101 can be a sepolyte such as a polymer separator soaked with liquid electrolyte or gel electrolyte, a solid polymer separator/electrolyte such as a PEO based separator or solid-state electrolytes such as lithium oxide or sulfide glasses or glass ceramics or ceramics. However, the separators 100, 101 placed in FIG. 1 first can simply be a polymer-base separator material capable of being soaked later with gel or electrolyte to form separators 100, 101, and thus the term separator as used herein is a broader term including a separator base material and separators capable of functioning to transfer lithium or similar battery material ions, while the term sepolyte include only separators capable of functioning to transfer lithium or similar battery material ions.

Separators 100, 101 can be preprocessed and placed on the current collector with or without a binder.

The SE-collector units can then be cut into individual units between the separator material for further processing, or attached to a polymer frame to form an "endless" roll of polymer foil with windows. The single SE-collector units on thus on a long polymer foil with windows for the electrode, can be rolled up again for further processing at a later time.

Figure 3:
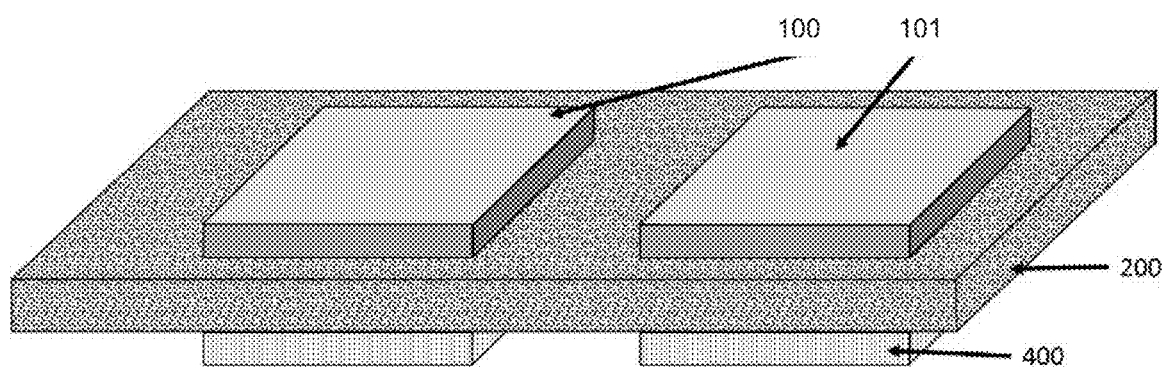
FIG. 3 shows an electrode material attached to the SEEL-collector units.
Figure 4:
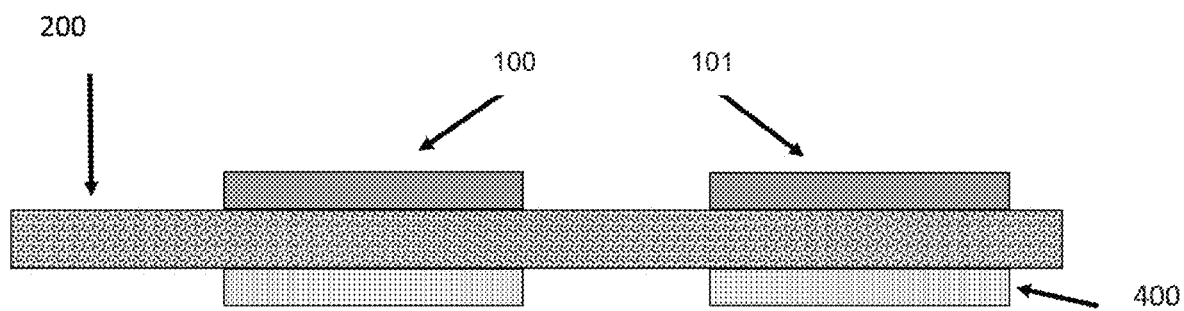
FIG. 4 shows a side view of FIG. 3.

FIGS. 3 and 4 show an electrode 400 made of cathode or anode material, preferable cathode material, bonded periodically directly on the current collector 200 to create SEEL-collector units. The electrode material can be a cathode or anode slurry containing binder. The slurry can be coated intermittently on the underside of the current collector foil via a slot die, or preprocessed and already in a shape to be fixed with a further binder onto the current collector 200. Conventional lithium-based material can be used for the anode or cathode material of electrode 400.

Figure 5:
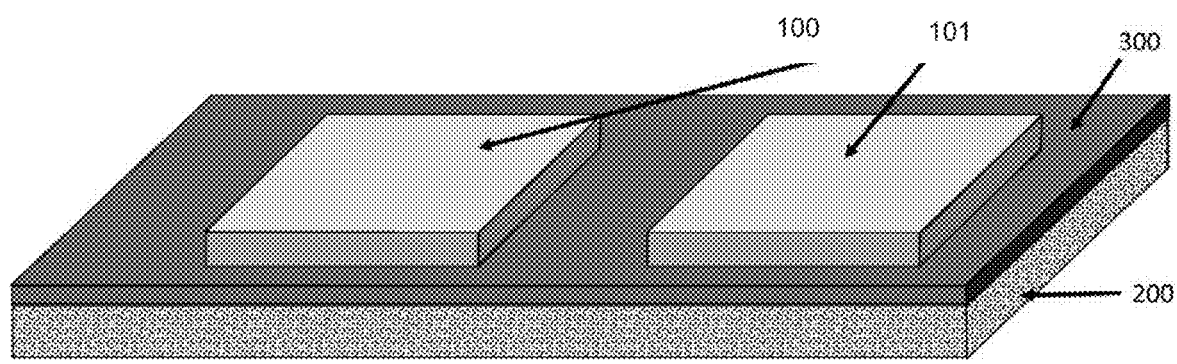
FIG. 5 shows a second embodiment in which a lubrication layer on a first side is present to form a CULUB-collector with a separator material.
Figure 6:
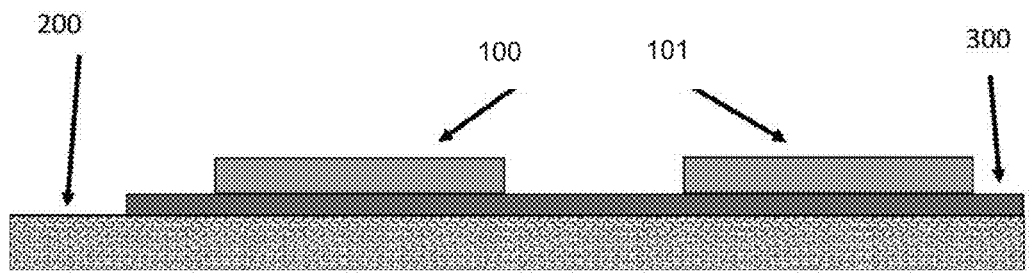
FIG. 6 shows a side view of FIG. 5.

Depending on the properties of the separator/sepolyte, a lubrication layer 300 can be placed between separators 100, 101 and current collector 200, as shown in FIGS. 5 and 6. Lubrication layer 300 is soft and allows sliding and reduced friction between the separator 100, 101 and current collector 200 during manufacturing and charging/discharging of the battery cell. Lubrication layer 300 is relatively softer than current collector 200 to minimize any physical stress onto the separator or sepolyte and has a good electronically conductivity.

Lubrication layer 300 on the current collector 200 can be made of soft material such as graphite or soft light metal including sodium, potassium, magnesium or calcium, or of soft heavy metal including tin, lead, bismuth, or cadmium, or of alloys such as Wood's metal or alloys such as tin-lead solder, soft solder and low-antimony soft solder. Lubrication layer 300 has a thickness of 0.05 to 500 $\mu$m, preferred 0.07 to 100 $\mu$m, most preferred 0.1 to 5 $\mu$m.

Separator 100, 101 can be periodically put or manufactured directly onto the CULUB collector.

Figure 7:
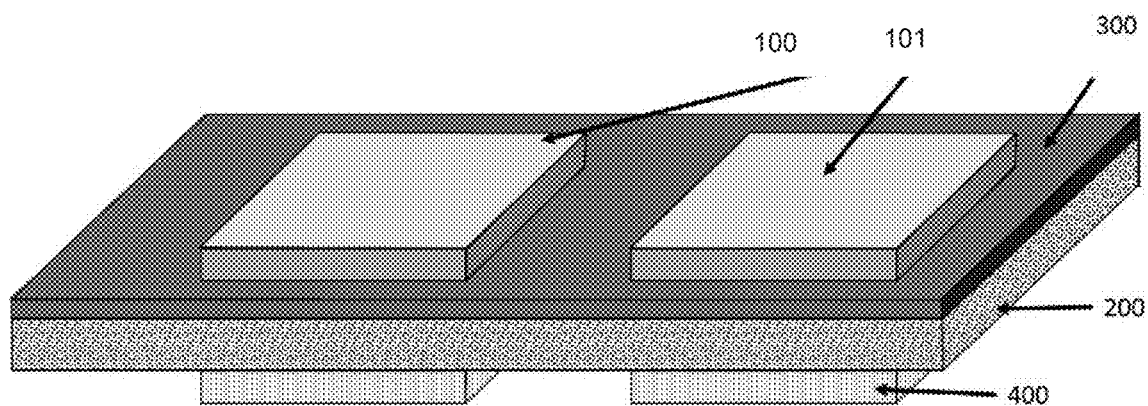
FIG. 7 shows the second embodiment of FIG. 6 with an electrode material on an opposing second side of the CULUB-collector.
Figure 8:
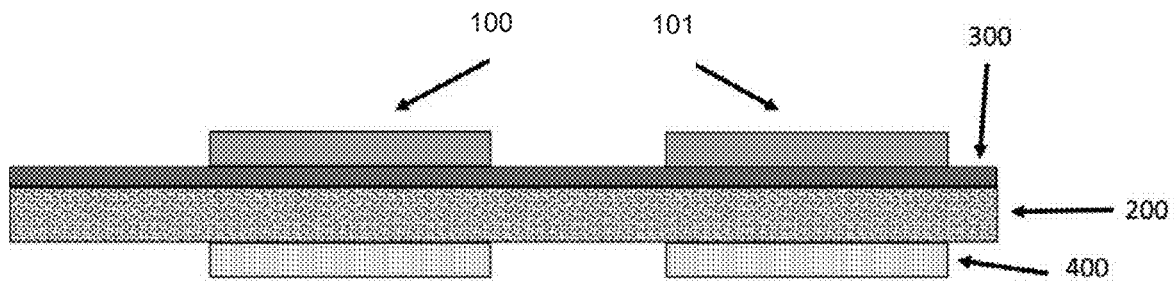
FIG. 8 shows a side view of FIG. 7.

If only one side of the CULUB collector has a separator or sepolyte the other side can be coated periodically with an electrode 400 of cathode or anode active material, as shown in FIGS. 7 and 8. The whole unit can be processed as a roll-to-roll process and creates a so-called SELUEL-collector unit (separator-electrolyte-lubrication layer-electrode-current collector unit). Separators 100, 101, preferably sepolytes, and electrodes 400 thus are fixed and bonded onto the current collector 200 or CULUB collector.

Figure 9:
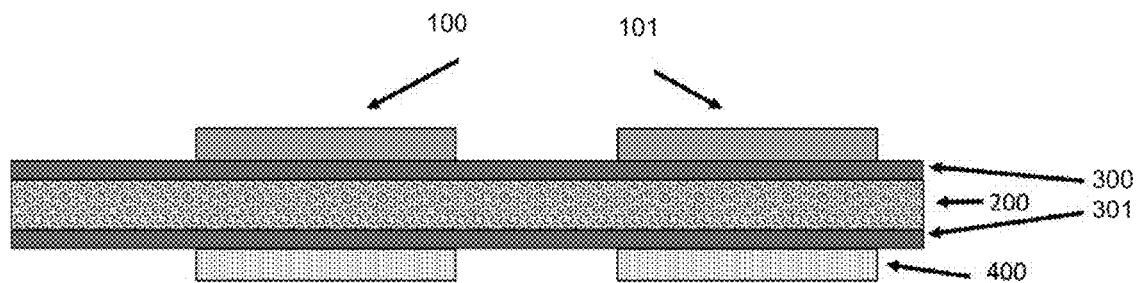
FIG. 9 shows a side view of a further embodiment with a lubrication layer on the opposing second side of the CULUB-collector.

FIG. 9 shows a SEDLUEL-collector unit (separator-electrolyte-double lubrication layer-electrode-current collector unit), with a second lubrication layer 301 similar to lubrication layer 300 between the current collector 200 and the electrodes 400.

The continuously connected units described above are then cut into single units of sepolyte-current collector-electrode or sepolyte-CULUB collector-electrode units. For a better and faster manufacturing of these units a polymer frame with at least one window can used to create polymer frame supported sepolyte-current collector-electrode or sepolyte-CULUB collector-electrode units. U.S. patent application Ser. No. 15/432,401, filed Feb. 14, 2017, for example describes such polymer frames and is hereby incorporated by reference herein.

Figure 10:
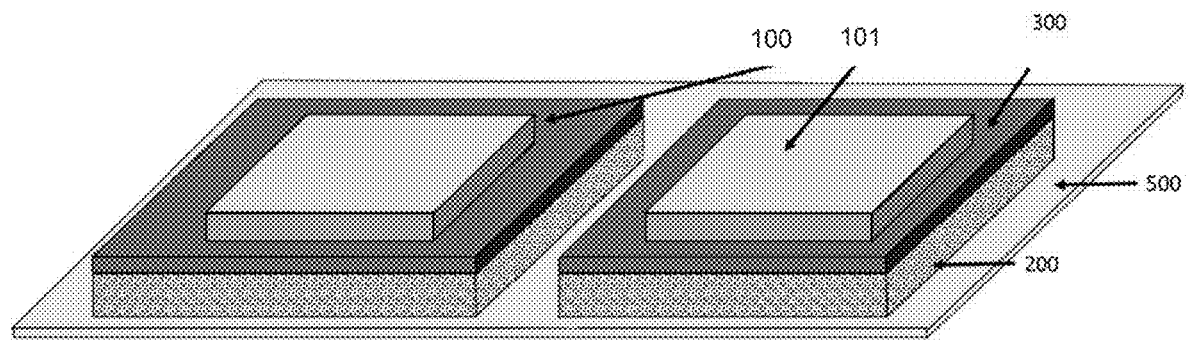
FIG. 10 shows a top plan view of the embodiment of FIG. 7, cut into individual battery components as SELUEL-collector units each supported in a polymer frame.
Figure 11:
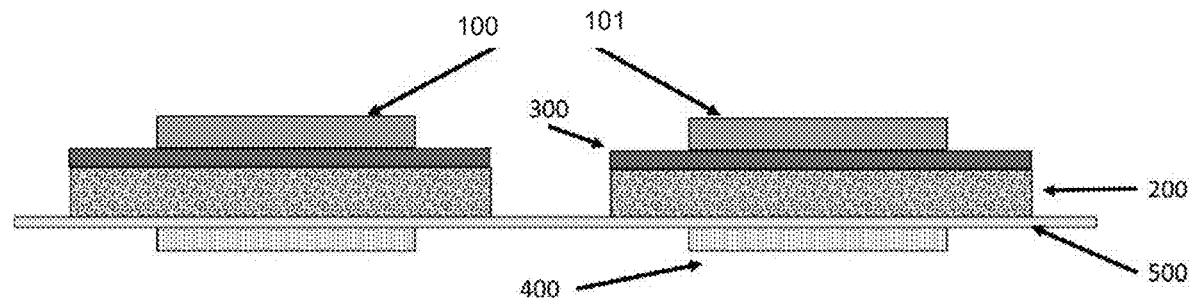
FIG. 11 shows a side view of the embodiment of FIG. 10 with the electrode material extending through windows in the polymer frame.

FIGS. 10 and 11 for example shows a top plan view of the embodiment of FIG. 7, cut into individual battery components as SELUEL-collector units each supported in a polymer frame 500 with two windows through which electrode 400 extends. Current collector 200 can be bonded, fixed, mounted, glued, welded, laminated, heat bonded or taped around the window to the polymer frame 500, which preferably is made of polyethylene, polypropylene or a mixture or polyethylene/polypropylene.

Figure 12:
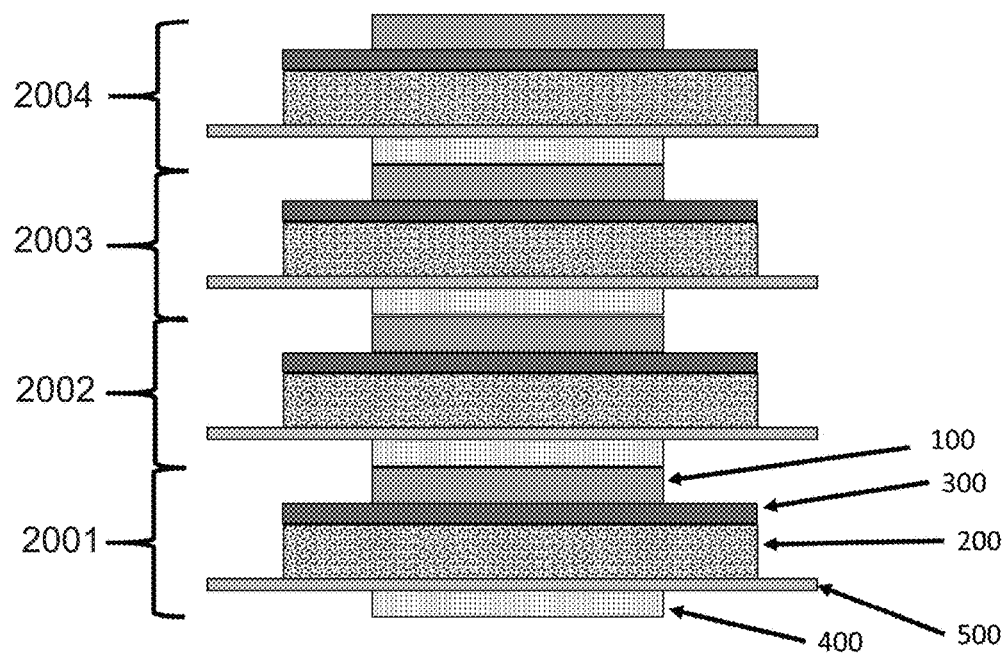
FIG. 12 shows four stacked individual SELUEL-collector units each individually supported in a polymer frame with a single window.

FIG. 12 shows four stacked individual SELUEL-collector units 2001, 2002, 2003, 2004 as in FIG. 7, each individually supported in a polymer frame 500 with a single window.

Figure 13:
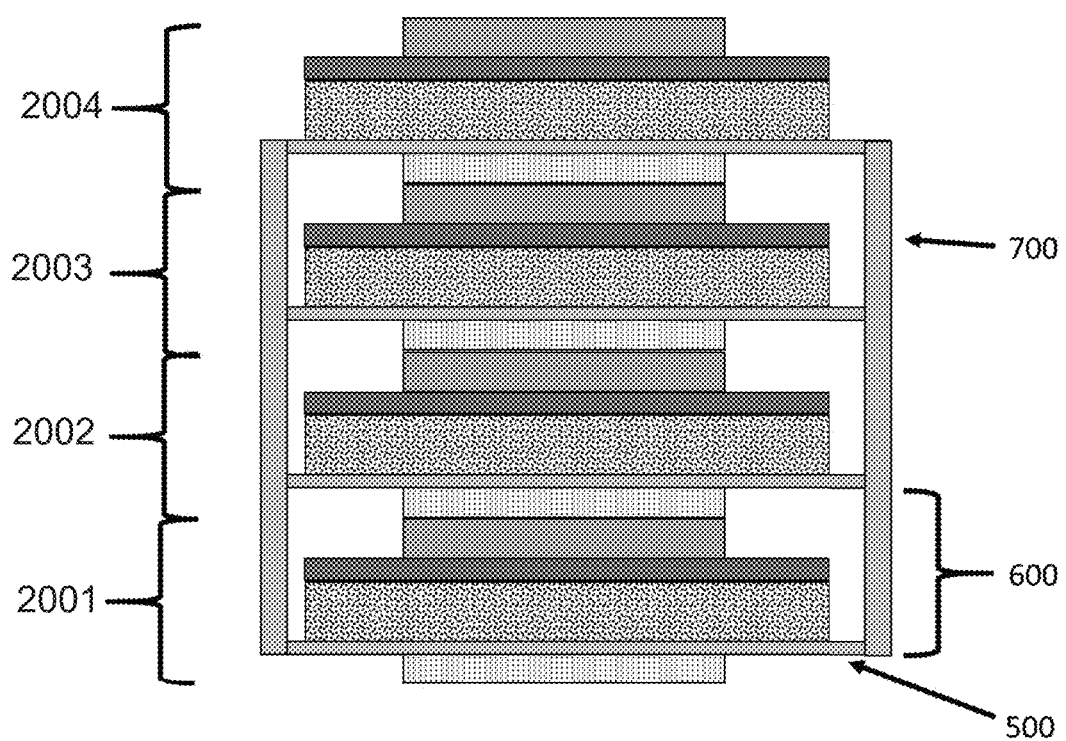
FIG. 13 shows a battery component with an encapsulated housing.

FIG. 13 shows a battery component as in FIG. 12 with an encapsulated housing with side walls 700. Individual compartments 600 are formed, which can allow for protection of the battery materials, for example from air and moisture therein.

Figure 14:
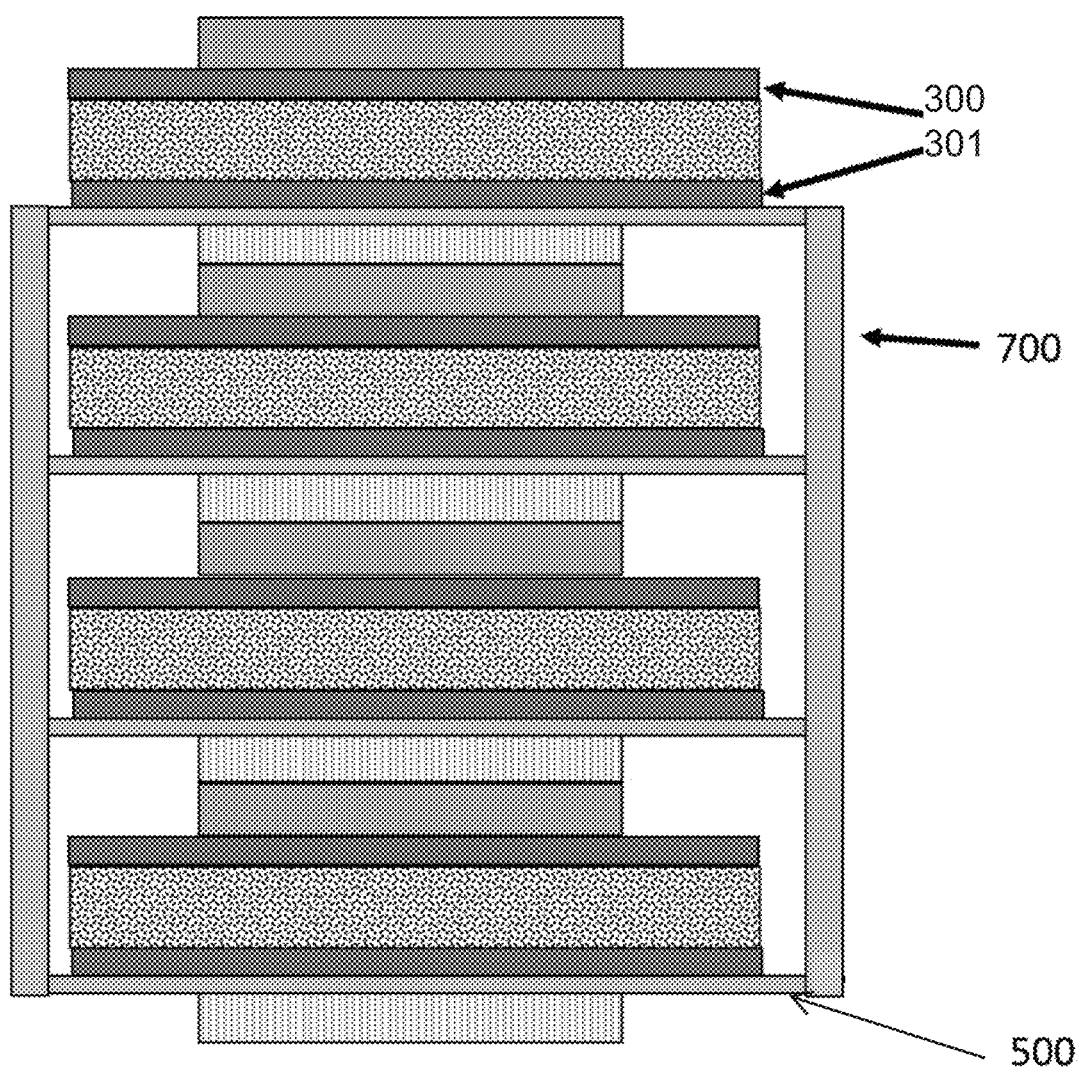
FIG. 14 shows a battery component similar to FIG. 13 but with double sided lubrication layers on the collector foil.

FIG. 14 shows a battery component similar to FIG. 13 but with lubrication layers 300, 301 on both sides of the collector 200, with the lubrication layer 301 attached to the polymer frame 500. An alternate second possibility is that the polymer frame is mounted onto the current collector foil. In that case, the lubrication layer 301 is not covering 100% of the surface of the current collector foil, leaving an uncoated surface on the current collector that can be used to mount the polymer frame directly onto the current collector, the lubrication and electrode layer then passing through the polymer frame window.

Figure 15:
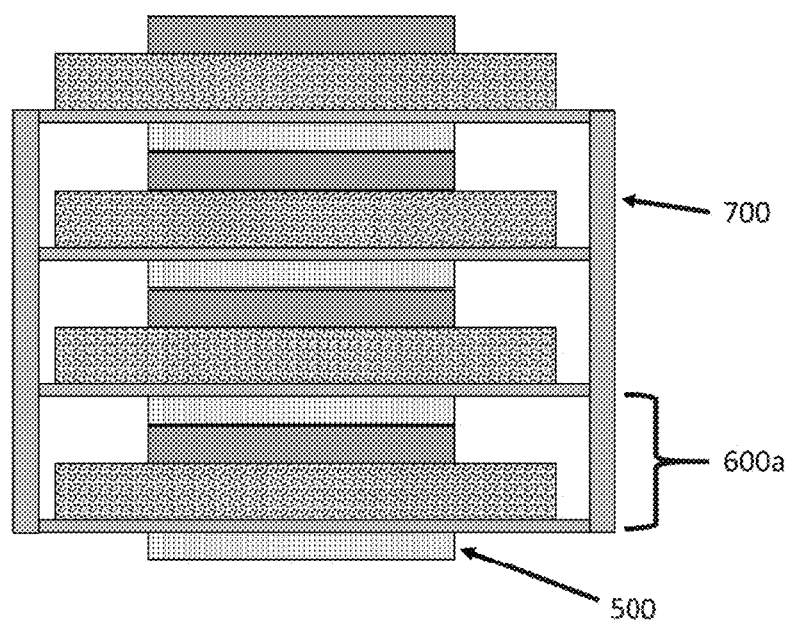
FIG. 15 shows the SEEL-collector units of FIG. 3 in a framed battery component.

FIG. 15 shows the SEEL-collector units of FIG. 3 in a framed battery component with walls 700 and forming compartments 600a.

The battery components described above can be connected and used to form an electric battery for example for a hybrid or electric vehicle.

Figure 16:
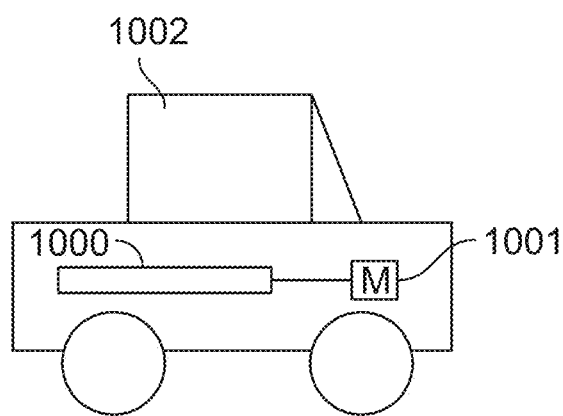
FIG. 16 shows schematically an electric vehicle with a battery made of the components of the present invention.

FIG. 16 shows schematically an electric vehicle 1002 with a battery 1000 made of the components of the present invention for powering an electric motor 1001.

What is claimed is:

1. A battery for an electric or hybrid vehicle comprising:
   a first current collector attached to a first polymer frame;
   a first electrode attached to the first current collector, the first electrode extending through the first polymer frame; and
   a first separator opposite the first electrode;
   a second current collector attached to a second polymer frame;
   a second electrode attached to the second current collector, the second electrode extending through the second polymer frame; and
   a second separator opposite the second electrode;
   the first electrode and the second separator being connected.

2. An electric or hybrid vehicle comprising the battery as recited in claim 1.

3. The battery as recited in claim 1 wherein the first and second current collectors are foils.

4. The battery as recited in claim 3 wherein the first and second current collectors each have a thickness of 1 to 50 μm.

5. The battery as recited in claim 3 wherein the first and second current collectors each have a thickness of 1 to 50 μm.

6. The battery as recited in claim 3 wherein the first and second current collectors each are made of copper, aluminum, nickel, nickel coated on aluminum or graphite.

7. The battery as recited in claim 3 further comprising a lubrication layer on the first current collector, the first separator being placed on the lubrication layer.

8. The battery as recited in claim 7 wherein the lubrication layer has a thickness of 0.1 to 5 μm.

9. The battery as recited in claim 7 wherein the lubrication layer is made of one of the group consisting of: graphite, sodium, potassium, magnesium, calcium, tin, lead, bismuth, cadmium, Wood's metal, and tin-lead solder.

10. The battery as recited in claim 7 wherein further comprising a further lubrication layer on the first current collector foil on a side opposing the lubrication layer.

* * * * *